Nov. 30, 1954     D. S. DICKINSON     2,695,627
WEIGHT LOADED PRESSURE REDUCER
Filed Oct. 19, 1951

Inventor:
Daniel S. Dickinson,
by *His Attorney.*

2,695,627

WEIGHT LOADED PRESSURE REDUCER

Daniel S. Dickinson, Scranton, Pa., assignor to General Electric Company, a corporation of New York Application October 19, 1951, Serial No. 252,136

14 Claims. (Cl. 137—514.7)

My invention relates generally to pressure reducing devices and particularly to pressure reducing devices for use between the two evaporators in a two-temperature refrigerating system for maintaining a desired pressure and temperature differential between the evaporators.

It is a primary object of my invention to provide in a pressure reducing device effective for maintaining a desired pressure differential between evaporators in a refrigerating system and including a valve arrangement, means for effectively stabilizing the valve action during the opening and closing thereof and as refrigerant flow changes alternately from liquid to gas.

It is another object of my invention to provide in such a device means whereby pressure equalization is permitted when the refrigerating unit in the system is not operating and while the valve is closed.

Further objects and advantages of my invention will become apparent as the following description proceeds and the features of novelty which characterize my invention will be pointed out with particularity in the claims annexed to and forming a part of this specification.

In carrying out the objects of my invention, I provide a device wherein a weight cooperates with the valve pin in a valve for maintaining a desired pressure differential between the high and low pressure sides of the valve. The weight also serves as a plunger in a dashpot arrangement whereby the movement of the valve and, therefore, the opening and closing actions of the valve are stabilized. Additionally, I provide sufficient clearance between the valve pin and the orifice in which it operates to permit pressure equalization during the non-operating periods of the refrigerating unit.

Figure 1:
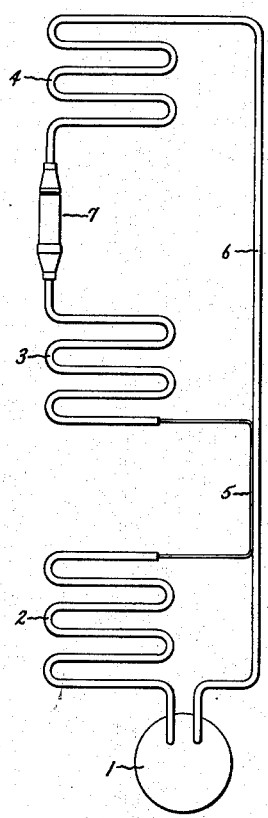
Figure 2:
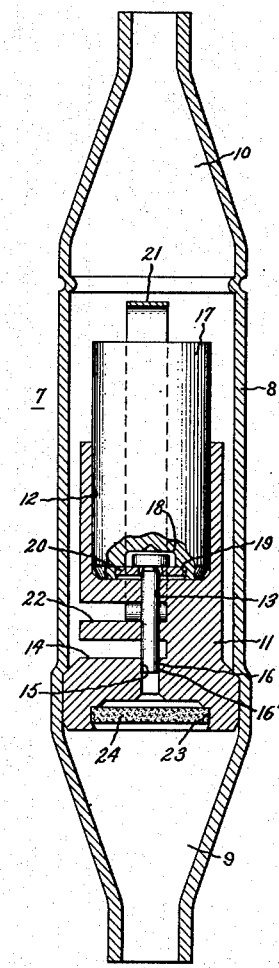
Figure 3:
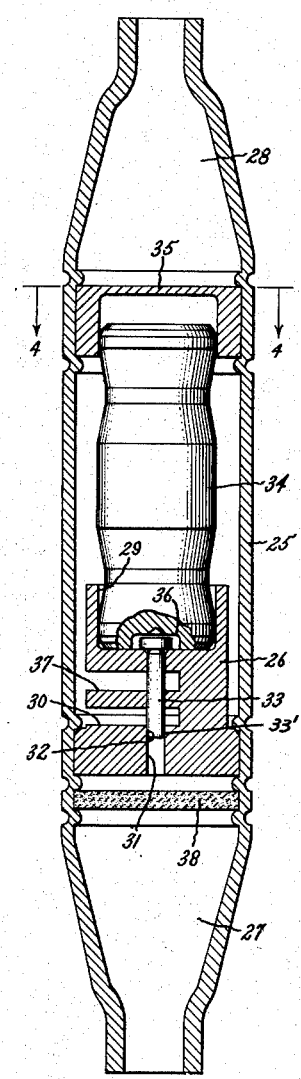
Figure 4:
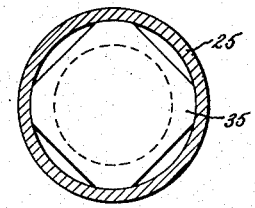

For a better understanding of my invention reference may be had to the accompanying drawing in which Fig. 1 is a schematic showing of a two temperature refrigerating system with my invention incorporated therein; Fig. 2 is a longitudinal sectional view through one embodiment of my invention; Fig. 3 is a longitudinal sectional view through another embodiment of my invention; and Fig. 4 is a section taken along the line 4—4 in Fig. 3.

Referring to the drawing, I have shown in Fig. 1 a two temperature refrigerating system which includes a refrigerating unit 1, a condenser 2, a high temperature evaporator 3 and a low temperature evaporator 4. Connecting the condenser 2 with the high temperature evaporator 3 is a capillary tube 5; and, connecting the low temperature evaporator 4 with the refrigerating unit 1 is a suction line or return conduit 6. Provided in the system for maintaining a desired pressure differential between the high and low temperature evaporators is the device of my invention which shall be herein generally designated as 7.

As seen in Fig. 2, one embodiment of my invention includes a cylindrical valve housing 8, the ends of which are reduced for connection to the low and high temperature evaporators 3 and 4. Fixed in the housing 8 and partitioning said housing into high and low pressure sides 9 and 10, respectively, is a member 11. Formed in the member 11 on the low pressure side of the housing 8 is a cylindrical recess 12. Connecting the bottom of the recess 12 with the high pressure side of the housing is a central bore or valve orifice 13. Also formed in the member 11 is a transverse slot or passage 14 which intersects the orifice 13 and provides a valve seat 15. The upper end of the member 11, as clearly seen in Fig. 2, is reduced in diameter and thereby permits passage between the slot 14 and the low pressure side of the housing.

Provided in the valve orifice 13 is a headed valve pin 16 which, when inserted in the valve seat 15 in the manner shown in Fig. 2, prevents refrigerant flow between the high and low pressure sides of the valve housing 8. When the valve pin 16 is raised out of the valve seat, refrigerant is permitted to flow freely from the high pressure side of the valve housing 8 through the slot 14 and around the upper end of the member 11 to the low pressure side of said valve housing. The lower end of said valve pin is square or substantially perpendicular to the longitudinal axis of the pin in order to minimize regulation of the flow of refrigerant past the valve seat 15. Also, the diameter of the stem of the valve pin 16 is such as to provide a slight clearance 16' between the pin and the orifice 13. This clearance permits pressure equalization between the high and low pressure sides of the system during the non-operating periods of the refrigerating unit 1 without substantially affecting the operation of the valve.

Provided in the cylindrical recess 12 and adapted for exerting a force on the valve pin 16 for maintaining a desired pressure differential between the high and low sides of the valve housing 8 is a weighted plunger 17. In the underside of the plunger 17 are formed a recess 18 and a counter-recess 19. Fixed in the counter-recess 19 is a washer 20 adapted for receiving the valve pin 16 and engaging the underside of the head thereof. The depth of the recess 18 is greater than the thickness of the valve pin head. This arrangement provides a lost-motion couple between the plunger and the valve pin which permits the valve pin to rise initially free of the plunger and to fall freely during the final closing movements thereof. In this manner side thrusts on the valve pin 16, which might be caused by the weight of the plunger and any off-center leanings of the plunger in the cylindrical recess and which might effect binding of the pin in the orifice 13 are minimized. Also, with the valve pin coupled to the plunger the valve may be opened for system evacuation simply by raising or actuating the plunger through the use of a magnet.

The cylindrical recess 12 and the plunger 17 also constitute a dashpot arrangement for stabilizing valve action. The extent of the upward movement of the plunger in the cylindrical recess is limited by a plunger stop 21 having both ends secured in another transverse slot or passage 22 formed in the member 11 between the cylindrical recess 12 and the slot.

When the pressure in the high pressure side of the valve housing 8 becomes sufficiently greater than the pressure on the low pressure side thereof to overcome the force exerted by the plunger 17 on the valve pin 16, it raises said valve pin out of the valve seat 15 to permit refrigerant flow through the slot 14. The valve pin in rising actuates the plunger 17 upward which effects a decrease of pressure in the cylindrical recess 12 below the plunger 17. Also, as the valve opens, the pressure in the low pressure side of the housing and on the top of the plunger is increased. This difference in pressure tends to cause the plunger to descend and thereby resist the raising of the valve pin 16. As the pressure difference between the high and low pressure sides of the housing decreases, the plunger 17 starts to descend and insert the pin 16 into the valve seat 15 for closing the valve. During the descent of the plunger, however, pressure increases in the cylindrical recess 12 below the plunger 17. This has a delaying effect on the descent of the plunger and, therefore, on the closing of the valve. These actions of the plunger in the cylinder have the effect of stabilizing the opening and closing actions of the valve during the flow of refrigerant therethrough or as the refrigerant flow changes alternately from liquid to vapor.

The above-mentioned transverse slot 22, in addition to providing anchorage for the plunger stop 21, connects the valve orifice 13 with the low pressure side of the housing 8. By this arrangement leakage around the valve pin and into the cylindrical recess 12 is minimized. Such leakage is undesirable in that it would raise the pressure on the bottom of the plunger 17, would reduce or destroy the stabilizing action referred to above, and would allow the valve to maintain a lower pressure differential than the weight of the plunger was originally intended for maintaining.

Formed in the member 11 and at the mouth of the valve orifice 13 is a bore 23 and fixed in this bore is a filter or screening element 24 provided for preventing dirt from entering the valve.

The second embodiment of my invention is shown in Fig. 3 and includes a cylindrical valve housing 25 partitioned by a member 26 secured therein into high and low pressure sides 27 and 28, respectively. The member 26 is similar to the member 11 in the above-described first embodiment in that its upper portion is reduced in diameter and also in that it includes a cylindrical recess 29, a first transverse slot or passage 30, and a valve orifice 31 connecting the cylindrical recess and the slot with the high pressure side of the housing. Provided for acting in the valve orifice 31 and cooperating with a valve seat 32, formed by the slot 30 and the valve orifice, is a headed valve pin 33 the lower end of which is also square to minimize regulation at the valve seat. Also, a clearance 33' is provided between the valve stem and orifice to permit pressure equalization between the high and low pressure sides of the housing during the non-operating periods of the refrigerating unit.

A weighted plunger 34 is provided for exerting a force on the valve pin 33 to maintain a desired pressure differential. The lower end of the plunger 34 cooperates with the cylindrical recess 29 to form a dashpot arrangement. The upper end of the plunger 34 is received in and guided by a cup 35 secured in the housing 25 in the low pressure side. As better seen in Fig. 4, the cup 35 is substantially square to permit free refrigerant flow through the low pressure side of the housing between the cup and the wall of the housing.

Provided in the underside of the plunger 34 is a recess 36, the depth of which is greater than the thickness of the head of the valve pin 33. This arrangement provides a lost motion between the valve pin and plunger which is effective for minimizing side thrust on said valve pin and possible binding thereof in the valve orifice 31.

When the pressure differential between the high pressure side and the low pressure side of the housing 25 is sufficient to overcome the weight of the plunger 34, the valve pin 33 is raised out of the valve seat 32 and refrigerant flows through the slot 30 and around the reduced upper portion of the member 26 to the low pressure side of said housing. The dashpot arrangement formed by the cylindrical recess 29 and the plunger 34 stabilizes the valve actions in both opening and closing of the valve in the same manner as the dashpot action described in connection with the embodiment shown in Fig. 2.

A second transverse slot or passage 37 in the member 26, located between the cylindrical recess 29 and the first slot 30, connects the valve orifice 31 with the low pressure side of the housing. The slot 37 is provided to minimize leakage into the cylindrical recess 29 from around the valve pin 33 in the same manner as the slot 22 in the form illustrated in Fig. 2.

Fixed in the housing 25 between the member 26 and the high pressure side 27 of said housing is a filter 38 for preventing the admittance of dirt into the valve.

This embodiment differs from the first in that no couple is provided between the valve pin and plunger. Therefore, it is intended primarily for employment in two-temperature refrigerating systems wherein evacuation is effected by means other than the raising of the plunger by use of a magnet.

While I have shown specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. A pressure reducing device for maintaining a desired pressure differential between the high and low temperature evaporators in a two-temperature refrigerating system comprising; a valve housing, a valve seat in said housing, a valve pin slidable in the bore of said valve seat for cooperation with the walls of said bore to open and close the valve, a plunger, said plunger being engaged by said valve pin after an initial free movement thereof, the weight of said plunger determining the pressure differential effective for raising said pin out of said valve seat to open said valve, and means including said plunger for providing a dashpot to stabilize the opening and closing actions of said valve.

2. A pressure reducing device for maintaining a desired pressure differential between the high and low temperature evaporators in a two-temperature refrigerating system comprising; a valve housing, a member fixed in said housing for dividing said housing into high and low pressure sides, said member including a cylindrical recess on said low pressure side, a valve orifice connecting said high pressure side and the bottom of said cylindrical recess, a passage connecting said orifice with said low pressure side, said passage and said orifice forming a valve seat, a valve pin in said orifice for cooperating with said valve seat to open and close the valve, and a plunger arranged for movement in said cylindrical recess, said plunger being engaged by said valve pin after an initial free movement thereof, the weight of said plunger determining the pressure differential effective for opening said valve, said plunger cooperating with said cylindrical recess to form a dashpot for stabilizing the opening and closing actions of said valve.

3. A pressure reducing device for maintaining a desired pressure differential between the high and low temperature evaporators in a two-temperature refrigerating system comprising; a valve housing, a member fixed in said housing for dividing said housing into high and low pressure sides, said member including a cylindrical recess on said low pressure side, a valve orifice connecting said high pressure side and the bottom of said cylindrical recess, a passage connecting said orifice with said low pressure side, said passage and said orifice forming a valve seat, a valve pin in said orifice for cooperating with said valve seat to open and close the valve, a plunger arranged for movement in said cylindrical recess, said plunger being engageable by said valve pin whereby the weight of said plunger determines the pressure differential effective for opening said valve, and means for providing lost motion between said pin and said plunger during the initial opening and final closing movements of said valve pin to minimize binding effects of said plunger on said pin, said plunger cooperating with said cylindrical recess to form a dashpot for stabilizing the opening and closing actions of said valve.

4. A pressure reducing device for maintaining a desired pressure differential between the high and low temperature evaporators in a two-temperature refrigerating system including a refrigerating unit when the refrigerating unit is operating and for equalizing pressure between the high and low temperature evaporators when said refrigerating unit is not operating, said device comprising; a valve housing, a member fixed in said housing for dividing said housing into high and low pressure sides, said member including a cylindrical recess on said low pressure side, a valve orifice connecting said high pressure side and the bottom of said cylindrical recess, a passage connecting said orifice with said low pressure side, said passage and said orifice forming a valve seat, a valve pin in said orifice for cooperating with said valve seat to open and close the valve, and a plunger arranged for movement in said cylindrical recess, said plunger being engaged by said valve pin after an initial free movement thereof, the weight of said plunger determining the pressure differential effective for opening said valve, said plunger cooperating with said cylindrical recess to form a dashpot for stabilizing the opening and closing actions of said valve, said valve pin fitting sufficiently loosely in said orifice to provide a clearance between the stem of said valve pin and said orifice for permitting pressure equalization between said high and low pressure sides.

5. A pressure reducing device for maintaining a desired pressure differential between the high and low temperature evaporators in a two-temperature refrigerating system comprising; a valve housing, a member fixed in said housing for dividing said housing into high and low pressure sides, said member including a cylindrical recess on said low pressure side, a valve orifice connecting said high pressure side and the bottom of said cylindrical recess, a passage connecting said orifice with said low pressure side, said passage and said orifice forming a valve seat, a valve pin in said orifice for cooperating with said valve seat to open and close the valve, a plunger arranged for movement in said cylindrical recess, said plunger being engaged by said valve pin after an initial free movement thereof, the weight of said plunger determining the pressure differential effective for opening said valve, said plunger cooperating with said cylindrical recess to form a dashpot for stabilizing the opening and closing actions of said valve, and another passage located between said first-mentioned passage and said cylindrical recess and connecting said valve orifice with said low pressure side whereby leakage into said cylindrical recess from said high pressure side is minimized.

6. A pressure reducing device for maintaining a desired pressure differential between the high and low temperature evaporators in a two-temperature refrigerating system including a refrigerating unit when the refrigerating unit is operating and for equalizing pressure between the high and low temperature evaporators when said refrigerating unit is not operating, said device comprising; a valve housing, a member fixed in said housing for dividing said housing into high and low pressure sides, said member including a cylindrical recess on said low pressure side, a valve orifice connecting said high pressure side and the bottom of said cylindrical recess, a passage connecting said orifice with said low pressure side, said passage and said orifice forming a valve seat, a valve pin in said orifice for cooperating with said valve seat to open and close the valve, a plunger arranged for movement in said cylindrical recess, said plunger being engageable by said valve pin whereby the weight of said plunger determines the pressure differential effective for opening said valve, said plunger cooperating with said cylindrical recess to form a dashpot for stabilizing the opening and closing actions of said valve, means for providing lost motion between said pin and said plunger during the initial opening and final closing movements of said valve pin to minimize binding effects of said plunger on said pin, said valve pin fitting sufficiently loosely in said orifice to provide a clearance between the stem of said valve pin and said orifice for permitting pressure equalization between said high and low pressure sides, and another passage located between said first mentioned passage and said cylindrical recess and connecting said valve orifice with said low pressure side whereby leakage into said cylindrical recess from said high pressure side is minimized.

7. A pressure reducing device for maintaining a desired pressure differential between the high and low temperature evaporators in a two-temperature refrigerating system comprising; a valve housing, a member fixed in and dividing said housing into high and low pressure sides, a cylindrical recess formed in said member on said low pressure side, a valve orifice connecting said cylindrical recess with said high pressure side, a passage connecting said orifice with said low pressure side, said passage and said orifice forming a valve seat, a valve pin in said orifice for cooperating with said valve seat to open and close said valve, and a plunger arranged for limited movement in said cylindrical recess, said valve pin and said plunger being connected by a lost-motion couple whereby binding effects of said plunger on said pin are minimized, the weight of said plunger determining the pressure differential effective for opening said valve, said plunger cooperating with said cylindrical recess to form a dashpot for stabilizing the opening and closing actions of said valve.

8. A pressure reducing device for maintaining a desired pressure differential between the high and low temperature evaporators in a two-temperature refrigerating system including a refrigerating unit when the refrigerating unit is operating and for equalizing pressure between the high and low temperature evaporators when said refrigerating unit is not operating, said device comprising; a valve housing, a member fixed in and dividing said housing into high and low pressure sides, a cylindrical recess formed in said member on said low pressure side, a valve orifice connecting said cylindrical recess with said high pressure side, a passage connecting said orifice with said low pressure side, said passage and said orifice forming a valve seat, a valve pin in said orifice for cooperating with said valve seat to open and close said valve, a plunger arranged for limited movement in said cylindrical recess, said valve pin and said plunger being connected by a lost-motion couple whereby binding effects of said plunger on said pin are minimized, the weight of said plunger determining the pressure differential effective for opening said valve, said plunger cooperating with said cylindrical recess to form a dashpot for stabilizing the opening and closing actions of said valve, said valve pin fitting sufficiently loosely in said orifice to provide a clearance between said valve pin and said orifice for permitting pressure equalization between said high and low pressure sides.

9. A pressure reducing device for maintaining a desired pressure differential between the high and low temperature evaporators in a two-temperature refrigerating system comprising; a valve housing, a member fixed in and dividing said housing into high and low pressure sides, a cylindrical recess formed in said member on said low pressure side, a valve orifice connecting said cylindrical recess with said high pressure side, a passage connecting said orifice with said low pressure side, said passage and said orifice forming a valve seat, a valve pin in said orifice for cooperating with said valve seat to open and close said valve, a plunger arranged for limited movement in said cylindrical recess, said valve pin and said plunger being connected by a lost-motion couple whereby binding effects of said plunger on said pin are minimized, the weight of said plunger determining the pressure differential effective for opening said valve, said plunger cooperating with said cylindrical recess to form a dashpot for stabilizing the opening and closing actions of said valve, and another passage located between the first-mentioned passage and said cylindrical recess and connecting said valve orifice with said low pressure side whereby leakage into said cylindrical recess from said high pressure side is minimized.

10. A pressure reducing device for maintaining a desired pressure differential between the high and low temperature evaporators in a two-temperature refrigerating system including a refrigerating unit comprising; a valve housing, a member fixed in and dividing said housing into high and low pressure sides, a cylindrical recess formed in said member on said low pressure side, a valve orifice connecting said cylindrical recess with said high pressure side, a passage connecting said orifice with said low pressure side, said passage and said orifice forming a valve seat, a valve pin in said orifice for cooperating with said valve seat to open and close said valve, a plunger arranged for movement in said cylindrical recess, a stop associated with said plunger to limit the movement thereof, said valve pin and said plunger being connected by a lost-motion couple whereby binding effects of said plunger on said pin are minimized, the weight of said plunger determining the pressure differential effective for opening said valve, said plunger cooperating with said cylindrical recess to form a dashpot for stabilizing the opening and closing actions of said valve, said valve pin fitting sufficiently loosely in said orifice to provide a clearance between the stem of said valve pin and said orifice for permitting pressure equalization between said high and low pressure sides during the non-operating periods of the refrigerating unit of the system, and another passage located between the first-mentioned passage and said cylindrical recess and connecting said valve orifice with said low pressure side whereby leakage into said cylindrical recess from said high pressure side is minimized.

11. A pressure reducing device for maintaining a desired pressure differential between the high and low temperature evaporators in a two-temperature refrigerating system comprising; a valve housing, a member fixed in and dividing said housing into high and low pressure sides, a cylindrical recess formed in said member on said low pressure side, a valve orifice connecting the bottom of said cylindrical recess with said high pressure side, a passage connecting said orifice with said low pressure side, said passage and said orifice forming a valve seat, a valve pin in said orifice for cooperating with said valve seat to open and close the valve, a plunger having one end arranged for guided movement in said cylinder, and a second member fixed in said housing for guiding the other end of said plunger and limiting the movement thereof, said plunger being engageable by said valve pin whereby the weight of said plunger determines the pressure differential effective for opening said valve, said plunger cooperating with said cylindrical recess to form a dashpot for stabilizing the opening and closing actions of said valve, said plunger including a recess in the underside thereof for providing lost motion between said valve pin and said plunger to minimize binding effects of said plunger on said pin.

12. A pressure reducing device for maintaining a desired pressure differential between the high and low temperature evaporators in a two-temperature refrigerating system including a refrigerating unit when the refrigerating unit is operating and for equalizing pressure between the high and low temperature evaporators when said refrigerating unit is not operating, said device comprising; a valve housing, a member fixed in and dividing said housing into high and low pressure sides, a cylindrical recess formed in said member on said low pressure side, a valve orifice connecting the bottom of said cylindrical recess with said high pressure side, a passage connecting said orifice with said low pressure side, said passage and said orifice forming a valve seat, a valve pin in said orifice for cooperating with said valve seat to open and close the valve, a plunger having one end arranged for guided movement in said cylinder, a second member fixed in said housing for guiding the other end of said plunger and limiting the movement thereof, said plunger being engageable by said valve pin whereby the weight of said plunger determines the pressure differential effective for opening said valve, said plunger cooperating with said cylindrical recess to form a dashpot for stabilizing the opening and closing actions of said valve, said plunger including a recess in the underside thereof for providing lost motion between said valve pin and said plunger to minimize binding effects of said plunger on said pin, and a clearance between the stem of said valve pin and said orifice permitting pressure equalization between said high and low pressure sides.

13. A pressure reducing device for maintaining a desired pressure differential between the high and low temperature evaporators in a two-temperature refrigerating system comprising; a valve housing, a member fixed in and dividing said housing into high and low pressure sides, a cylindrical recess formed in said member on said low pressure side, a valve orifice connecting the bottom of said cylindrical recess with said high pressure side, a passage connecting said orifice with said low pressure side, said passage and said orifice forming a valve seat, a valve pin in said orifice for cooperating with said valve seat to open and close the valve, a plunger having one end adapted for guided movement in said cylindrical recess, a second member fixed in said housing for guiding the other end of said plunger and limiting the movement thereof, said plunger being engageable by said valve pin whereby the weight of said plunger determines the pressure differential effective for opening said valve, said plunger cooperating with said cylindrical recess to form a dashpot for stabilizing the opening and closing actions of said valve, said plunger including a recess in the underside thereof for providing lost motion between said valve pin and said plunger to minimize binding effects of said plunger on said pin, and another passage located between the first-mentioned passage and said cylindrical recess and connecting said valve orifice with said low pressure side whereby leakage into said cylindrical recess from said high pressure side is minimized.

14. A pressure reducing device for maintaining a desired pressure differential between the high and low temperature evaporators in a two-temperature refrigerating system including a refrigerating unit when the refrigerating unit is operating and for equalizing pressure between the high and low temperature evaporators when said refrigerating unit is not operating, said device comprising; a valve housing, a member fixed in and dividing said housing into high and low pressure sides, a cylindrical recess formed in said member on said low pressure side, a valve orifice connecting the bottom of said cylindrical recess with said high pressure side, a passage connecting said orifice with said low pressure side, said passage and said orifice forming a valve seat, a valve pin in said orifice for cooperating with said valve seat to open and close the valve, a plunger having one end adapted for guided movement in said cylindrical recess, a second member fixed in said housing for receiving and guiding the other end of said plunger, said second member also being effective for limiting the movement of said plunger, said plunger being engageable by said valve pin whereby the weight of said plunger determines the pressure differential effective for opening said valve, said plunger cooperating with said cylindrical recess to form a dashpot for stabilizing the opening and closing actions of said valve, said plunger including a recess in the underside thereof for providing lost motion between said valve pin and said plunger to minimize binding effects of said plunger on said pin, said valve pin fitting sufficiently loosely in said orifice to provide a clearance between the stem of said valve pin and said orifice for permitting pressure equalization between said high and low pressure sides, and another passage located between the first-mentioned passage and said cylindrical recess and connecting said valve orifice with said low pressure side whereby leakage into said cylindrical recess from said high pressure side is minimized.

References Cited in the file of this patent

UNITED STATES PATENTS

| Number | Name | Date |
|---|---|---|
| 1,598,487 | Marden | Aug. 31, 1926 |
| 1,850,117 | McMillan | Mar. 22, 1932 |
| 2,218,700 | Cornell | Oct. 22, 1940 |
| 2,361,881 | Sheppard | Oct. 31, 1944 |
| 2,486,899 | Williams | Nov. 1, 1949 |
| 2,602,467 | Griswold | July 8, 1952 |
| 2,649,774 | Spencer | Aug. 25, 1953 |

FOREIGN PATENTS

| Number | Country | Date |
|---|---|---|
| 302,306 | Italy | Oct. 24, 1932 |